United States Patent [19]

Peker et al.

[11] Patent Number: 5,772,803
[45] Date of Patent: Jun. 30, 1998

[54] TORSIONALLY REACTING SPRING MADE OF A BULK-SOLIDIFYING AMORPHOUS METALLIC ALLOY

[75] Inventors: Atakan Peker, Aliso Viejo; William L. Johnson, Pasadena; David M. Scruggs, Oceanside, all of Calif.

[73] Assignee: Amorphous Technologies International, Laguna Niguel, Calif.

[21] Appl. No.: 702,918

[22] Filed: Aug. 26, 1996

[51] Int. Cl.$^6$ .................................................. C22C 45/10
[52] U.S. Cl. ........................ 148/561; 148/403; 267/154; 420/417; 420/422
[58] Field of Search .................................. 148/403, 561; 420/417, 422; 267/154, 155

[56] References Cited

U.S. PATENT DOCUMENTS

| 4,623,387 | 11/1986 | Masumoto et al. | 148/403 |
|---|---|---|---|
| 4,648,609 | 3/1987 | Deike | 267/155 |
| 4,976,417 | 12/1990 | Smith | 267/155 |
| 5,032,196 | 7/1991 | Masumoto et al. | 148/403 |
| 5,288,344 | 2/1994 | Peker et al. | 148/403 |

*Primary Examiner*—George Wyszomierski
*Attorney, Agent, or Firm*—Gregory Garmong

[57] ABSTRACT

A torsionally reacting spring, such as a helical spring, a torsion bar, or a torsion tube, requires the ability to torsionally deform elastically during service and return to its original, undeformed shape. The torsionally reacting spring is made of a bulk-deforming amorphous alloy which may be cooled from the melt at a cooling rate of less than about 500° C. per second, yet retain an amorphous structure. A preferred bulk-solidifying amorphous alloy has a composition, in atomic percent, of from about 45 to about 67 percent total of zirconium plus titanium, from about 10 to about 35 percent beryllium, and from about 10 to about 38 percent total of copper plus nickel, plus incidental impurities, the total of the percentages being 100 atomic percent.

17 Claims, 3 Drawing Sheets

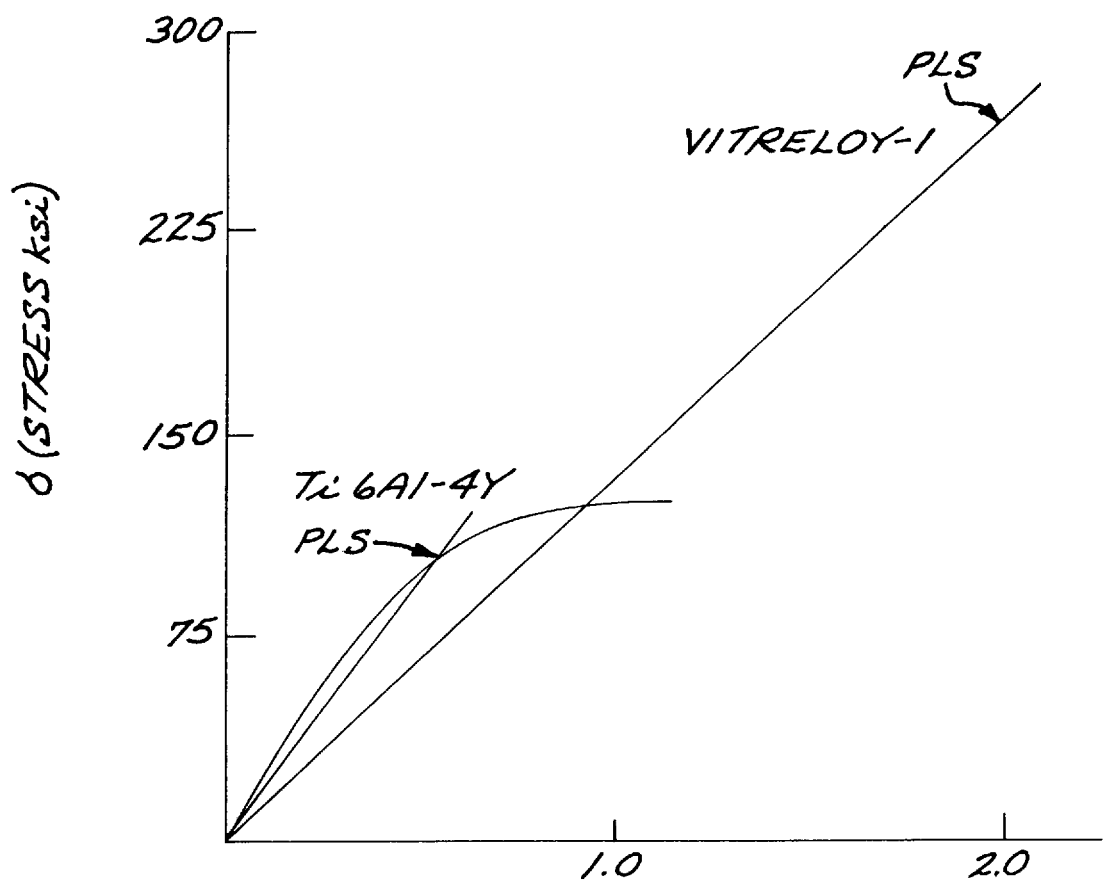
FIG. 2
FIG. 4
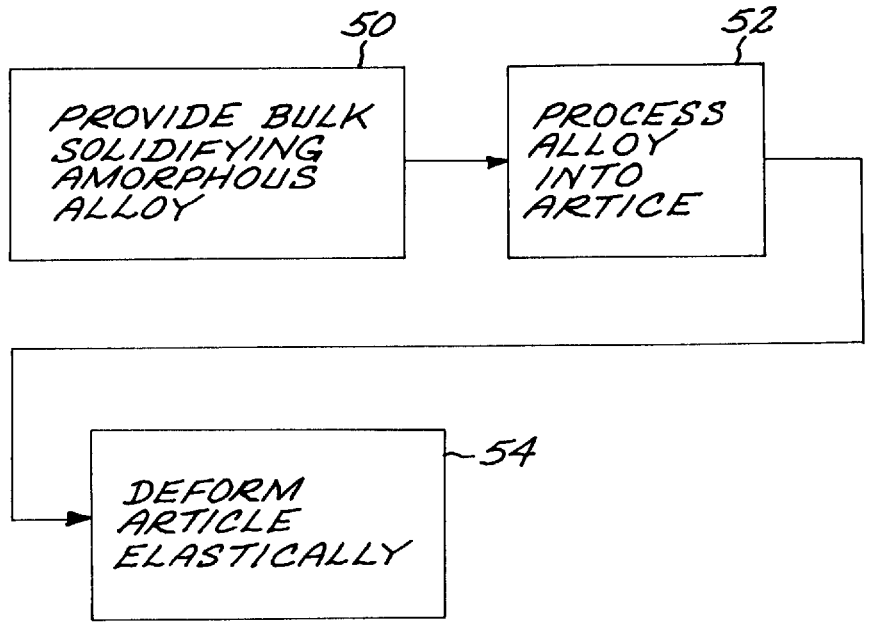

TORSIONALLY REACTING SPRING MADE OF A BULK-SOLIDIFYING AMORPHOUS METALLIC ALLOY

BACKGROUND OF THE INVENTION

This invention relates to torsionally reacting springs, and, more particularly, to such springs made of a bulk-solidifying amorphous alloy.

A spring is a useful article that, during service, is deformable by a deformation force up to a material proportional limit strain when loaded from an initial shape, yet returns to the initial shape upon relaxation of the deformation force. If the spring is deformed past the material proportional limit strain, it will not return to the original shape when the deformation force is removed, and, for some purposes, the spring will no longer be operable. The design of the spring and the mode of application of the deformation force according to that design define the type of spring.

One important type of spring is the torsionally reacting spring, in which the material of the spring is deformed wholly or partially in torsion (as distinct from linear tension/compression or bending). Well-recognized examples of torsionally reacting springs include torsion bars and torsion tubes, which are loaded by rotational forces at their ends. Conventional helical (also sometimes termed "coil" springs) are also torsionally reacting springs, as that term is used herein, because a mechanical analysis of their endwise extension or compression demonstrates that the material is deformed in a combination of torsion and bending.

The mechanical property which determines the ability of a material to act as an effective torsionally reacting spring is its maximum elastic deformation possible prior to the onset of plastic (permanent) deformation. This degree of maximum elastic deformation is termed herein the "proportional limit" strain, although other terms such as the "elastic limit" and the "offset limit" are sometimes used, depending upon varying definitions of the behavior of the material. Most engineering materials have a proportional limit strain of only about ½ percent strain, but, even with this small strain value, effective springy articles are made from these materials. Some materials exhibit larger elastic deformations at the proportional limit strain due to phenomena such as an increase in the proportional limit strain following work hardening, but these materials have other characteristics such as susceptibility to fatigue damage which limit their usefulness for many engineering applications.

The designs for some applications of torsionally reacting springs could utilize a proportional limit strain of at least about 1 percent. Metallic materials are not generally available to produce useful torsionally reacting springs with such high proportional limit strains. In other designs, it is important to achieve particular torsional deformation spring performance in as small a space or as small a weight as possible.

There is a need for improved torsionally reacting springs and improved materials for use in such articles. The present invention fulfills this need, and further provides related advantages.

SUMMARY OF THE INVENTION

The present invention provides torsionally reacting springs made of a material whose elastic properties permit the articles to be deformed extensively and whose non-elastic properties are suitable for engineering applications. The articles may be made in conventional shapes, forms, and sizes, but their spring-like properties are improved over those possible with conventional engineering materials. The articles may be made by either casting or working processes.

In accordance with the invention, an article of manufacture comprises a torsionally reacting spring made at least in part of a bulk-solidifying amorphous metallic alloy. Such a bulk-solidifying amorphous metallic alloy may be cooled from the melt at a cooling rate of less than about 500° C. per second, yet retain an amorphous structure. Examples of such torsionally reacting springs include compression and tension helical springs, torsion bars, and torsion tubes. A preferred composition for the amorphous alloy, in atomic percent, is of from about 45 to about 67 percent total of zirconium plus titanium, from about 10 to about 35 percent beryllium, and from about 10 to about 38 percent total of copper plus nickel, plus incidental impurities, the total of the percentages being 100 atomic percent.

The use of the bulk-solidifying amorphous metallic alloy, which retains the amorphous state upon cooling at rates from the melt of 500° C. or less, permits substantial engineering articles to be fabricated. The known bulk-solidifying amorphous alloys have elastic proportional limit strains of at least about 1½ percent, and typically of from about 1½ to 2½ percent. Unlike conventional engineering materials, there is substantially no microplastic deformation prior to yielding at the proportional limit strain, so that there is little disposition toward microplasticity-based hysteresis and fatigue during loading/unloading or loading/unloading/reverse loading/unloading cycles.

Additionally, the bulk-solidifying amorphous metallic alloys have properties which render them excellent engineering materials. They have lower densities than steels, excellent strengths, and good corrosion resistance.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 1A–1C are views of three types of torsionally reacting springs, wherein FIG. 1A is a perspective view of a torsion bar, FIG. 1B is a perspective view of a torsion tube, and FIG. 1C is a side sectional view of a helical spring;

FIG. 2 is a graph of stress-strain curves for a bulk-solidifying amorphous alloy and for a conventional titanium alloy;

FIG. 4 is a block flow diagram of a preferred approach for practicing the invention.

DETAILED DESCRIPTION OF THE PREFERRED EMBODIMENTS

As used herein, a springy article is a useful article that, during service, is deformable by a deformation force up to a material torsional proportional limit strain when loaded from an initial shape, yet returns to the initial shape upon relaxation of the deformation force. The present invention relates to torsional springs, generically termed "torsionally reacting springs" herein. In a torsionally reacting spring, the resolved force applied to the springy article is wholly or partially a torsional force, as distinct from an extension/ compression force or a bending force. (However, there may be components of extension/compression force or bending force applied in addition to the torsional force.)

Figure 1A:
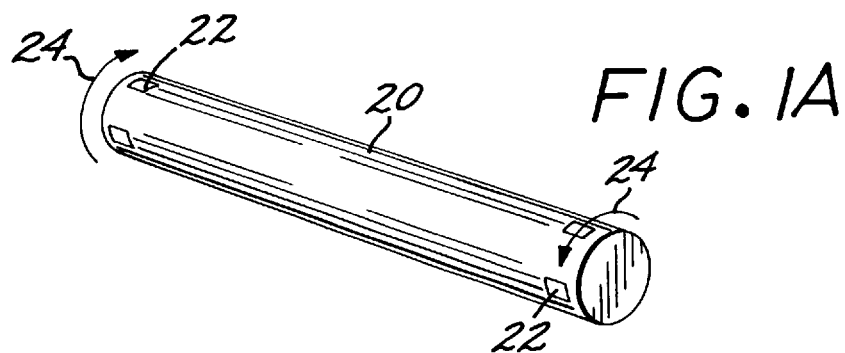
Figure 1B:
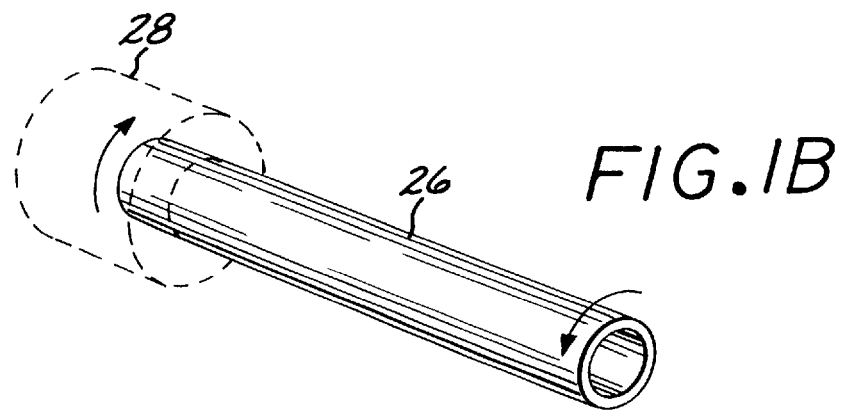
Figure 1C:
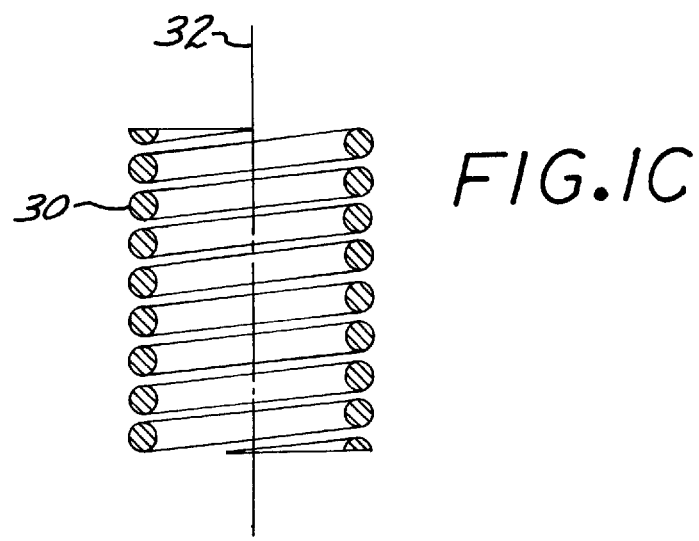

FIGS. 1A–1C depict three torsionally reacting springs. A torsion bar 20 is shown in FIG. 1A. The torsion bar 20 is a solid piece of metal, usually cylindrical in shape, which has integral attachments 22 along the length of the solid piece to introduce torsional deformation forces (indicated schematically by arrows 24) into the solid piece. Any type of integral attachment that can transfer torsional forces into the torsionally reacting spring may be used, such as lugs, drilled-and-tapped holes, etc. A torsion tube 26 is shown in FIG. 1B. The torsion tube is a hollow tube, usually cylindrical in shape, which also optionally has attachments thereon but is depicted as not having attachments. Where there are no attachments to introduce torsional deformation forces into the torsionally reacting spring, the forces are introduced by external structures such as a clamp 28 shown in phantom lines in FIG. 1B. At the other end of the torsion tube, other structure is provided to transfer the torsional deformation forces into the torsion tube, such as an attachment structure or an external clamp. Either integral attachments or external attachments may be used with any type of torsionally reacting spring.

FIG. 1C depicts a helical spring 30, which is loaded axially parallel to the direction 32 by either compression or extension forces. A mechanical analysis of the helical spring shows that the coils are loaded in a combination of torsional and bending loadings. The helical spring therefore falls within the definition of a torsionally reacting spring as used herein, because the material that forms the spring is deformed in torsion, at least in part.

For torsionally reacting spring applications such as shown in FIGS. 1A–1C, the article requiring springiness is made, at least in part, of a bulk-solidifying amorphous metallic alloy, either preferably by casting the alloy to shape in a properly configured mold or by first casting the alloy and then forming it to shape. Bulk-solidifying amorphous alloys are a recently developed class of amorphous alloys that may retain their amorphous structures when cooled from high temperatures at rates of about 500° C. or less, depending upon the alloy composition. Bulk-solidifying amorphous alloys have been described, for example, in U.S. Pat. Nos. 5,288,344, 5,368,659, and 5,032,196, whose disclosures are incorporated by reference.

Bulk-solidifying amorphous metallic alloys may be cooled from the melt at relatively low cooling rates, on the order of 500° C. per second or less, yet retain an amorphous structure. Such metals do not experience a liquid/solid crystallization transformation upon cooling, as with conventional metals. Instead, the highly fluid, non-crystalline form of the metal found at high temperatures becomes more viscous as the temperature is reduced, eventually taking on the outward physical appearance and characteristics of a conventional solid. Even though there is no liquid/solid crystallization transformation for such a metal, an effective "freezing temperature", $T_g$ (often referred to as the glass transition temperature), may be defined as the temperature below which the viscosity of the cooled liquid rises above $10^{13}$ poise. At temperatures below $T_g$, the material is for all practical purposes a solid. An effective "fluid temperature, $T_f$, may be defined as the temperature above which the viscosity falls below $10^2$ poise. At temperatures above $T_g$, the metallic material is for all practical purposes a liquid. At temperatures between $T_f$ and $T_g$, the viscosity of the bulk-solidifying amorphous metal changes slowly and smoothly with temperature. For the zirconium-titanium-nickel-copper-beryllium alloy of the preferred embodiment, $T_g$ is about 310°–400° C. and $T_f$ is about 700°–800° C.

This ability to retain an amorphous structure even with a relatively slow cooling rate is to be contrasted with the behavior of other types of amorphous metals that require cooling rates of at least about $10^4$–$10^{6°}$ C. per second from the melt to retain the amorphous structure upon cooling. Such metals may only be fabricated in amorphous form as thin ribbons or particles. Such a metal has limited usefulness because it cannot be prepared in the thicker sections required for typical articles of the type prepared by more conventional casting techniques, and it certainly cannot be used to prepare three-dimensional articles.

A preferred type of bulk-solidifying amorphous metallic alloy has a composition of about that of a deep eutectic composition. Such a deep eutectic composition has a relatively low melting point and a steep liquidus. The composition of the bulk-solidifying amorphous alloy should therefore preferably be selected such that the liquidus temperature of the amorphous alloy is no more than about 50°–75° C. higher than the eutectic temperature, so as not to lose the advantages of the low eutectic melting point.

A preferred type of bulk-solidifying amorphous metallic alloy family has a composition near a eutectic composition, such as a deep eutectic composition with a eutectic temperature on the order of 660° C. This material has a composition, in atom percent, of from about 45 to about 67 percent total of zirconium plus titanium, from about 10 to about 35 percent beryllium, and from about 10 to about 38 percent total of copper plus nickel, plus incidental impurities, the total of the percentages being 100 atomic percent. A substantial amount of hafnium may be substituted for some of the zirconium and titanium, aluminum may be substituted for the beryllium in an amount up to about half of the beryllium present, and up to a few percent of iron, chromium, molybdenum, or cobalt may be substituted for some of the copper and nickel. A most preferred such metal alloy material, termed Vitreloy-1™ alloy, has a composition, in atomic percent, of about 41.2 percent zirconium, 13.8 percent titanium, 10 percent nickel, 12.5 percent copper, and 22.5 percent beryllium. This bulk-solidifying alloy is known and is described in U.S. Pat. 5,288,344.

Another such metallic alloy family material has a composition, in atom percent, of from about 25 to about 85 percent total of zirconium and hafnium, from about 5 to about 35 percent aluminum, and from about 5 to about 70 percent total of nickel, copper, iron, cobalt, and manganese, plus incidental impurities, the total of the percentages being 100 atomic percent. A most preferred metallic alloy of this group (but less preferred than the Vitreloy-1™ alloy) has a composition, in atomic percent, of about 60 percent zirconium, about 15 percent aluminum, and about 25 percent nickel. This alloy system is less preferred than that described in the preceding paragraph. Other bulk-solidifying alloy families, such as those based on aluminum and magnesium, are operable but even less preferred.

The use of bulk-solidifying amorphous metallic alloys in torsionally reacting springs offers some surprising and unexpected advantages over conventional metals used as materials of construction of such springs. The bulk-solidifying amorphous alloys exhibit a large fully-elastic deformation without any yielding, as shown in FIG. 2 for the case of Vitreloy-1™ material. (In FIG. 2, "PLS" indicates the proportional limit strain for each respective material). This bulk-solidifying amorphous alloy exhibits a proportional limit strain of about 2 percent and to a stress of about 270 ksi (thousands of pounds per square inch) before yielding. Bulk solidifying amorphous alloys generally have proportional limit strains of at least about 1½ percent, and typically from about 1½ to about 2½ percent. The energy density stored when the material is stressed to the yield point, sometimes termed $U_d$, is 2.7 ksi. By comparison, a current titanium alloy yields at a proportional limit strain of about 0.65 percent and a stress of about 110 ksi, with a stored energy density $U_d$ to the yield point of about 0.35 ksi.

Torsionally reacting springs are often designed according to the limitation that the material of construction may not be not strained above its proportional limit strain. For example, in the case of a torsion bar or torsion tube, the spring must be sufficiently long that a desired torsional displacement may be accommodated between the ends of the spring, without the material of construction exceeding its proportional limit strain (or some defined fraction thereof, as a safety margin). A torsion bar or torsion tube made of a bulk-solidifying amorphous alloy having a proportional limit of 2 percent strain may be made ¼ the length (and ¼ the volume) of a conventional torsion bar or torsion tube having a proportional limit of ½ percent strain. In many applications, the available space for the torsionally reacting spring is at a premium, and the reduction in length and volume achieved by the present approach is an important benefit. The torsion bar or torsion tube made of the bulk-solidifying amorphous alloy is accordingly of lesser weight than the torsion bar or tube made of conventional material, although the reduction in weight also depends upon the relative densities of the materials. Similar considerations apply for helical springs.

Another important material property affecting the performance of the material used in a torsionally reacting spring is the energy dissipation in the metallic material during loading/unloading or loading/unloading/reverse loading/unloading cycles. Many metallic alloys experience microyielding in grains oriented for plastic microslip, even at applied strains below the proportional limit strain. For many applications, particularly those requiring loading to relatively high strains just below the proportional limit strain, the microstrains produced by microyielding accumulate and can lead to failure or at least reduced fatigue resistance.

Figure 3:
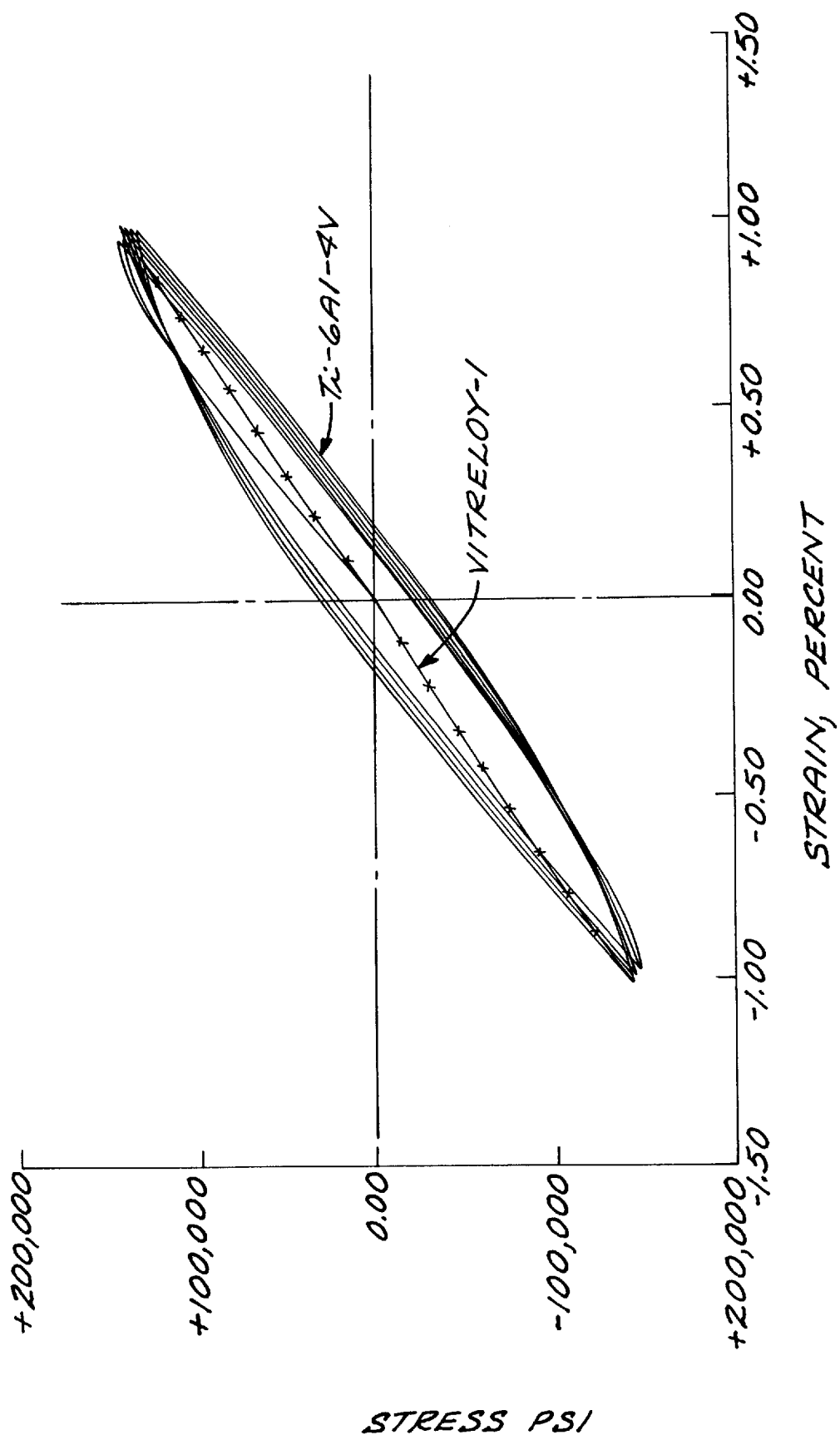
FIG. 3 is a graph of stress as a function of strain during cyclic loading of a bulk-solidifying amorphous alloy and a conventional titanium alloy.

FIG. 3 illustrates the deformation behavior of aircraft-quality, forged and heat-treated titanium-6 weight percent aluminum-4 weight percent vanadium (Ti-6Al-4V), a known material for use in some applications requiring springy performance, as compared with that of the Vitreloy-1™ alloy, when cyclically strained to a moderately high strain level of about 1 percent tension strain followed by 1 percent compression strain. Yielding is evidenced by a hysteresis in the cyclic stress-strain curve upon repeated loading and reverse loading, even when the loading is below the macroscopic yield point (a phenomenon termed "microyielding"). The Ti-6Al-4V exhibits extensive hysteresis resulting from the yielding and microyielding. The Vitreloy-1™ bulk-solidifying amorphous alloy exhibits no hysteresis upon repeated loading and reverse loading. The absence of hysteresis in the loading behavior of the Vitreloy-1™ alloy results from the amorphous microstructure of the material wherein there are no grains or other internal structures which exhibit microplastic deformation and consequently microyielding during loading and reverse loading. The Vitreloy-1™ alloy therefore exhibits improved springy properties as compared with conventional polycrystalline alloys.

The desirable deformation behavior of the springy material made according to the invention may be characterized as an elastic proportional strain limit of at least about 1½ percent, preferably greater than about 1.8 percent, with an accompanying plastic strain of less than about 0.01 percent, preferably less than about 0.001 percent up to the elastic proportional strain limit. That is, the material exhibits substantially no plastic deformation when loaded to about 80 percent of its fracture strength.

The bulk-solidifying amorphous metallic alloys have excellent corrosion resistance due to the absence of grain boundaries. They have as-cast surfaces that are very smooth, when cast against a smooth surface, and have low coefficients of friction. The smooth surface is attractive in appearance.

FIG. 4 illustrates a preferred approach for preparing and using a springy article according to the invention. A bulk-solidifying amorphous metallic alloy is provided, numeral 50. Most preferably, the alloy is the Vitreloy-1™ alloy discussed previously. The alloy is processed into the form of the article, numeral 52, such as one of the articles shown in FIGS. 1A–1C or other form of torsionally reacting spring. The alloy may be processed either by casting alone, or by casting and then deformation processing to shape. In either case, the casting must be such that the alloy is cast with a sufficiently high cooling rate that the alloy retains its amorphous state upon cooling. The article is then used in such a manner that it is deformed elastically in torsion, numeral 54. If an attachment structure is required in the application of step 54, that attachment structure may be provided integrally with the torsionally reacting spring and made of the bulk-solidifying amorphous alloy, provided integrally with the torsionally reacting spring but from other materials and attached to the torsionally reacting spring, or provided externally.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article of manufacture comprising a torsionally reacting spring a substantial portion of which comprises a bulk-solidifying amorphous metallic alloy which is capable of being cooled from the melt at a cooling rate of less than about 500° C. per second, yet retain an amorphous structure.

2. The article of claim 1, wherein the torsionally reacting spring is a helical spring.

3. The article of claim 1, wherein the torsionally reacting spring is a torsion bar.

4. The article of claim 1, wherein the torsionally reacting spring is a torsion tube.

5. The article of claim 1, wherein the bulk-solidifying amorphous metallic alloy has a composition, in atomic percent, of from about 45 to about 67 percent total of zirconium plus titanium, from about 10 to about 35 percent beryllium, and from about 10 to about 38 percent total of copper plus nickel, plus incidental impurities, the total of the percentages being 100 atomic percent.

6. The article of claim 1, wherein the bulk-solidifying amorphous metallic alloy has a composition, in atomic percent, of from about 25 to about 85 percent total of zirconium and hafnium, from about 5 to about 35 percent aluminum, and from about 5 to about 70 percent total of nickel, copper, iron, cobalt, and manganese, plus incidental impurities, the total of the percentages being 100 atomic percent.

7. The article of claim 1, wherein the bulk-solidifying amorphous metallic alloy has an elastic proportional limit strain of at least about 1½ percent strain.

8. The article of claim 1, further including
an attachment at each end of the torsionally reacting spring, the attachments providing means for introducing a force into the torsionally reacting spring.

9. The article of claim 8, wherein at least one of the attachments is integral with the torsionally reacting spring.

10. The article of claim 8, wherein at least one of the attachments is not integral with the torsionally reacting spring.

11. A method for providing springy performance in an article, comprising the steps of:
providing a bulk-solidifying amorphous metallic alloy, the bulk-solidifying amorphous metallic alloy being a metallic alloy which is capable of being cooled from the melt at a cooling rate of less than about 500° C. per second, yet retain an amorphous structure; and
processing the bulk-solidifying amorphous metallic alloy into the shape of a torsionally reacting spring having an amorphous metallic structure.

12. The method of claim 11, wherein the step of providing includes the step of providing a bulk-solidifying amorphous metallic alloy having a proportional limit strain of at least about 1½ percent.

13. The method of claim 11, including an additional step, after the step of processing, of
deforming the torsionally reacting spring in torsion.

14. The method of claim 13, wherein the step of deforming includes the step of
deforming the torsionally reacting spring with a deformation force such that the strain in the torsionally reacting spring does not exceed a material proportional limit strain.

15. The method of claim 11, wherein the step of processing includes the step of
processing the bulk-solidifying amorphous metallic alloy into the shape of a helical spring.

16. The method of claim 11, wherein the step of processing includes the step of
processing the bulk-solidifying amorphous metallic alloy into the shape of a torsion bar.

17. The method of claim 11, wherein the step of processing includes the step of
processing the bulk-solidifying amorphous metallic alloy into the shape of a torsion tube.

* * * * *